(12) United States Patent
Nakagawa (10) Patent No.: US 8,755,069 B2
(45) Date of Patent: Jun. 17, 2014

(54) COMMUNICATION DEVICE, IMAGE FORMING APPARATUS, METHOD USING THE DEVICE AND COMPUTER READABLE MEDIUM

(75) Inventor: Tomoka Nakagawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 499 days.

(21) Appl. No.: 12/915,916

(22) Filed: Oct. 29, 2010

(65) Prior Publication Data

US 2011/0286048 A1 Nov. 24, 2011

(30) Foreign Application Priority Data

May 19, 2010 (JP) ................................. 2010-115254

(51) Int. Cl.
- *G06F 3/12* (2006.01)
- *H04N 1/32* (2006.01)
- *H04L 12/50* (2006.01)
- *H04L 12/28* (2006.01)

(52) U.S. Cl.
USPC ......... 358/1.15; 358/1.13; 358/442; 370/386; 370/395.5; 370/399

(58) Field of Classification Search
USPC ........................................ 358/1.15, 442, 444
See application file for complete search history.

(56) References Cited

U.S. PATENT DOCUMENTS

| | | | | |
|---|---|---|---|---|
| 7,142,511 | B2 * | 11/2006 | Thune et al. ................ | 370/230.1 |
| 8,050,279 | B2 * | 11/2011 | Li et al. ....................... | 370/395.5 |
| 8,401,022 | B2 * | 3/2013 | Maes et al. .................. | 370/395.5 |
| 8,526,037 | B2 * | 9/2013 | Emori et al. ................. | 358/1.15 |
| 2001/0040692 | A1 * | 11/2001 | Matsueda et al. ............ | 358/1.14 |
| 2003/0126262 | A1 * | 7/2003 | Yoshida et al. ............... | 709/226 |
| 2007/0086061 | A1 * | 4/2007 | Robbins ........................ | 358/400 |
| 2007/0291764 | A1 * | 12/2007 | Wu ............................... | 370/395.5 |
| 2008/0002669 | A1 * | 1/2008 | O'Brien et al. ............... | 370/352 |
| 2008/0008191 | A1 * | 1/2008 | Eguchi .......................... | 370/397 |
| 2008/0024591 | A1 * | 1/2008 | Doi et al. ..................... | 348/14.01 |
| 2008/0130047 | A1 * | 6/2008 | Shudo ........................... | 358/1.15 |
| 2008/0153492 | A1 * | 6/2008 | Shi et al. ...................... | 455/435.1 |
| 2008/0158597 | A1 * | 7/2008 | Hashimoto et al. .......... | 358/1.15 |
| 2008/0192751 | A1 * | 8/2008 | Xiong et al. ................. | 370/395.3 |
| 2009/0153908 | A1 * | 6/2009 | Fahrenthold ................. | 358/400 |
| 2009/0262382 | A1 * | 10/2009 | Nobutani ...................... | 358/1.15 |
| 2010/0076600 | A1 * | 3/2010 | Cross et al. .................. | 700/259 |
| 2010/0103462 | A1 * | 4/2010 | Maemura ..................... | 358/1.15 |
| 2010/0214588 | A1 * | 8/2010 | Nakahara ..................... | 358/1.13 |
| 2010/0238458 | A1 * | 9/2010 | Sakuda et al. ................ | 358/1.2 |
| 2010/0238503 | A1 * | 9/2010 | Sakuda et al. ............... | 358/1.15 |
| 2010/0238810 | A1 * | 9/2010 | Ormazabal ................... | 370/242 |
| 2010/0253962 | A1 * | 10/2010 | Higuchi et al. ............... | 358/1.13 |

(Continued)

FOREIGN PATENT DOCUMENTS

JP  2009-135261 A  6/2009

*Primary Examiner* — Madelein A Nguyen
(74) *Attorney, Agent, or Firm* — Sughrue Mion, PLLC (57) ABSTRACT

A communication device includes a first acquisition unit that acquires communication setting information of communication device from a server, the communication setting information being information necessary for communication between communication devices through a communication network; a second acquisition unit that acquires network identification information, which is information for identifying the communication network to which the communication device is connected, on the basis of the communication setting information acquired by the first acquisition unit; and a selection unit that, in accordance with the network identification information acquired by the second acquisition unit, selects an operation scheme of the communication device when the communication device communicates with another device through the communication network.

17 Claims, 7 Drawing Sheets

(56) References Cited

U.S. PATENT DOCUMENTS

| | | | |
|---|---|---|---|
| 2010/0259788 A1* | 10/2010 | Sakuda et al. | 358/1.15 |
| 2011/0019233 A1* | 1/2011 | Inoue | 358/1.15 |
| 2011/0093584 A1* | 4/2011 | Qiu et al. | 709/224 |
| 2011/0107379 A1* | 5/2011 | Lajoie et al. | 725/87 |
| 2011/0173689 A1* | 7/2011 | Kim et al. | 726/8 |
| 2011/0235095 A1* | 9/2011 | Kudo et al. | 358/1.15 |
| 2011/0265133 A1* | 10/2011 | Kure | 725/93 |
| 2011/0292426 A1* | 12/2011 | Sasano et al. | 358/1.13 |
| 2012/0002240 A1* | 1/2012 | Min | 358/1.15 |
| 2013/0198396 A1* | 8/2013 | Scherer et al. | 709/227 |

* cited by examiner

COMMUNICATION DEVICE, IMAGE FORMING APPARATUS, METHOD USING THE DEVICE AND COMPUTER READABLE MEDIUM

CROSS-REFERENCE TO RELATED APPLICATION

This application is based on and claims priority under 35 U.S.C. §119 from Japanese Patent Application No. 2010-115254 filed on May 19, 2010.

BACKGROUND

Technical Field

The present invention relates to a communication device, an image forming apparatus, a method using the device and a computer readable medium.

SUMMARY

According to an aspect of the invention, there is provided a communication device including:

a first acquisition unit that acquires communication setting information of communication device from a server, the communication setting information being information necessary for communication between communication devices through a communication network;

a second acquisition unit that acquires network identification information, which is information for identifying the communication network to which the communication device is connected, on the basis of the communication setting information acquired by the first acquisition unit; and a selection unit that, in accordance with the network identification information acquired by the second acquisition unit, selects an operation scheme of the communication device when the communication device communicates with another device through the communication network.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the invention will be described in detail with reference to the accompanying drawings.

First Exemplary Embodiment

Figure 1:
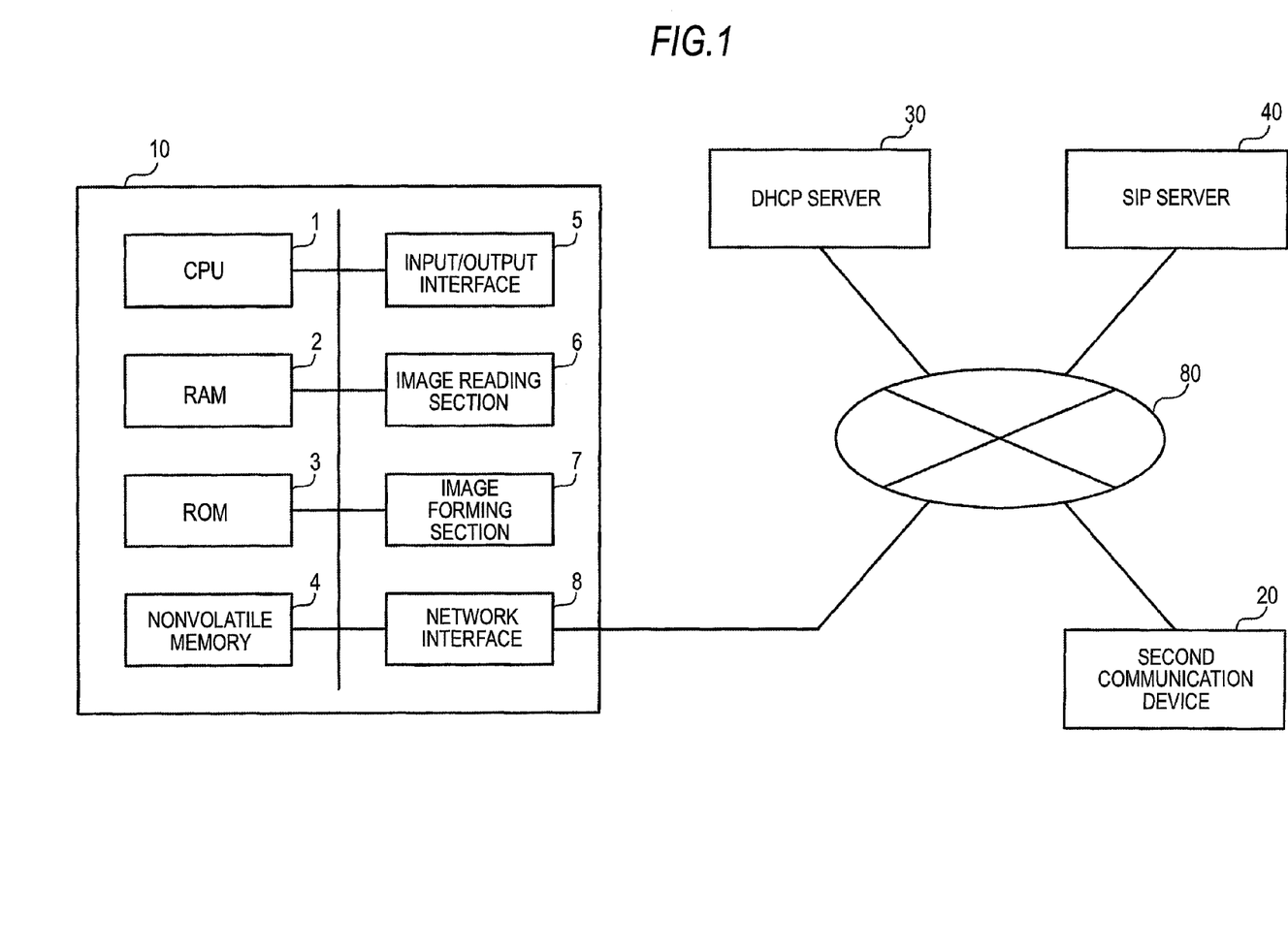
FIG. 1 is a diagram showing an example of the configuration of a communication system to which an exemplary embodiment of the invention is applied.

FIG. 1 is a diagram showing an example of the configuration of a communication system to which this exemplary embodiment is applied. As shown in FIG. 1, the communication system is configured such that a first communication device 10, a second communication device 20, a DHCP (Dynamic Host Configuration Protocol) server 30, and a SIP (Session Initiation Protocol) server 40, which are examples of a communication device and an image forming apparatus, are connected to each other through a network 80.

In this exemplary embodiment, an image forming apparatus having an IP (Internet Protocol) facsimile function corresponding to the SIP is used as the first communication device 10. The IP facsimile refers to a facsimile machine that performs transmission/reception of image data using a T.37 or T.38-compliant protocol recommended by ITU-T (International Telecommunication Union-Telecommunication sector). The second communication device 20 may be an image forming apparatus or a simple facsimile machine. In this exemplary embodiment, similarly to the first communication device 10, a communication device having an IP facsimile function is used as the second communication device 20. As the network 80, an IP network, such as Internet, is used.

First, the hardware configuration of the first communication device 10 will be described.

As shown in FIG. 1, the first communication device 10 includes a CPU (Central Processing Unit) 1, a RAM (Random Access Memory) 2, a ROM (Read Only Memory) 3, a nonvolatile memory 4, an input/output interface 5, an image reading section 6, an image forming section 7, and a network interface 8.

The CPU 1 loads various programs stored in the ROM 3 or the like to the RAM 2 and executes the programs, realizing respective functions which will be described below with reference to FIG. 3.

The RAM 2 is a memory that is used as a work memory of the CPU 1 or the like.

The ROM 3 is a memory that stores various programs to be executed by the CPU 1, and the like.

The nonvolatile memory 4 is a memory, such as a flash memory, which is rewritable and capable of holding data even when power supply is cut off. The nonvolatile memory 4 stores various pieces of setting information and the like necessary for the operation of the first communication device 10.

The input/output interface 5 displays information to be sent to a user on an operation panel (not shown) of the first communication device 10 and receives an input operation of the user through the operation panel or the like.

The image reading section 6 reads an image recorded on a recording medium, such as paper. The image reading section 6 is, for example, a scanner, and may be a CCD (Charge Coupled Device) type in which reflected light of light irradiated from a light source onto an original document is reduced by a lens and received by a CCD, or a CIS (Contact Image Sensor) type in which reflected light of light sequentially irradiated from an LED light source onto an original document is received by a CIS.

The image forming section 7 forms an image on a recording medium, such as paper. The image forming section 7 is, for example, a printer, and may be an electrophotographic type in which toner on a photosensitive member is transferred to a recording medium to form an image, or an ink jet type in which ink is ejected onto a recording medium to form an image. In this exemplary embodiment, the image forming section 7 is provided as an example of an image forming unit.

The network interface 8 transmits/receives data with respect to another device, such as the second communication device 20, through the network 80. For example, the network interface 8 transmits information accumulated in the nonvolatile memory 4 or data of an image read by the image reading section 6 to the second communication device 20, or receives data of an image or the like from the second communication device 20. The received image is formed on the recording medium by the image forming section 7.

Examples of the network (communication network) environment to which the IP facsimile is connected include an Internet (or Intranet) environment, a next-generation network (NGN), or the like. Such an environment may be segmentalized by a provider (vendor) of the network. The operation, such as call control of the IP facsimile, may differ based on such a network environment.

Figure 2A:
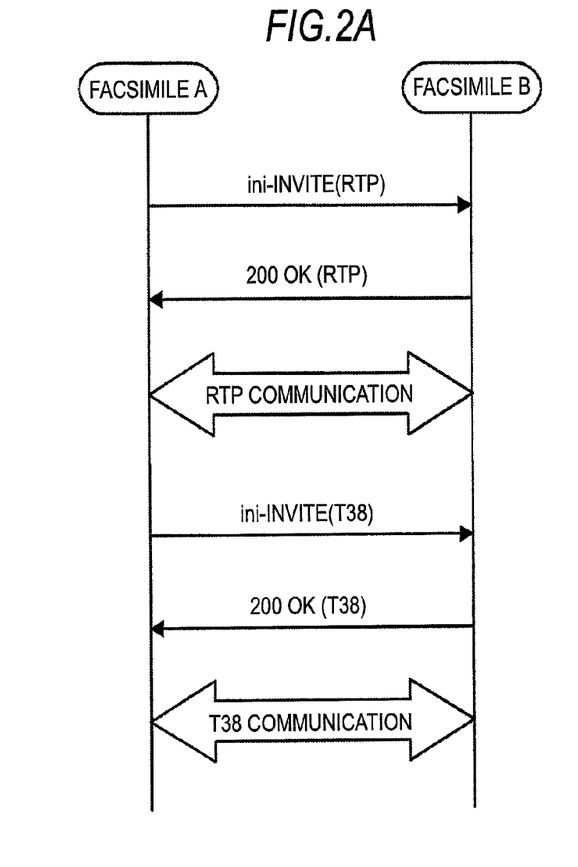
FIGS. 2A and 2B are sequence diagrams illustrating a difference based on a network environment of call control between two facsimile devices.
Figure 2B:
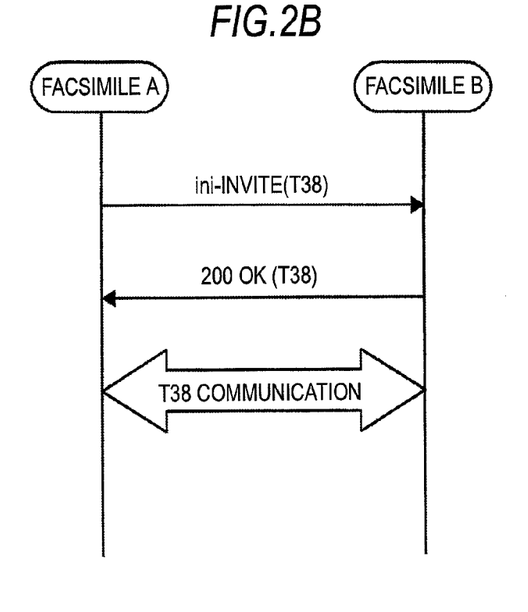

FIGS. 2A and 2B are sequence diagrams illustrating a difference based on a network environment of call control between two facsimile machines. FIG. 2A shows a sequence of call control in the Internet environment, and FIG. 2B shows a sequence of call control in the NGN environment.

In the Internet environment, considering that a facsimile machine that is capable of making only a voice call may be a contact, as shown in FIG. 2A, after negotiation based on RTP (Real-time Transport Protocol) is first performed, negotiation based on T.38 is performed. Meanwhile, in the NGN environment, since only a telephone makes a voice call from among the devices connected to the NGN, as shown in FIG. 2B, negotiation based on T.38 is performed from the beginning.

In order to cope with the difference based on the network environment, for example, multiple operation modes, such as an Internet mode where call control of FIG. 2A is performed in the Internet environment and an NGN mode where call control of FIG. 2B is performed in the NGN environment, are prepared in the IP facsimile. However, if an operation mode set by an administrator of a communication system does not match the network environment of the communication system, it is impossible to certify the operation of the IP facsimile.

Accordingly, in this exemplary embodiment, the first communication device 10 sets the operation mode of the communication device in accordance with the network parameters acquired from the DHCP server 30 when the first communication device 10 is activated. Specifically, when the first communication device 10 is activated, DHCP negotiation with the DHCP server 30 is performed. When the parameters specific to the network 80 are included in the response from the DHCP server 30 at that time, the first communication device 10 analyzes the parameters and sets the operation mode of the communication device to an operation mode corresponding to the network 80 in accordance with the analysis result. Details of the network parameters, the DHCP negotiation, and the like will be described below.

Hereinafter, the functional configuration of the first communication device 10 in this exemplary embodiment will be described in detail.

Figure 3:
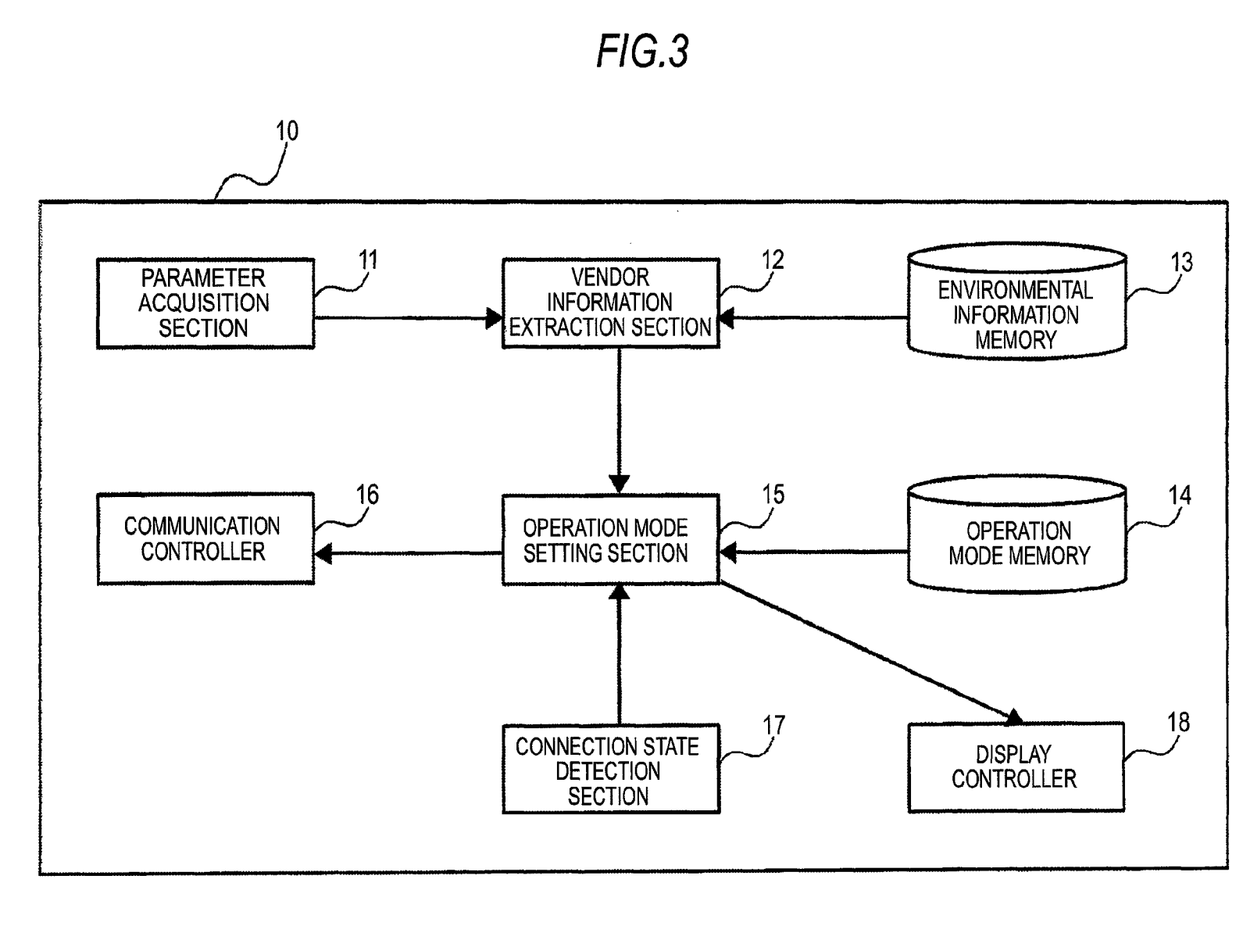
FIG. 3 is a block diagram showing an example of the functional configuration of a first communication device according to an exemplary embodiment of the invention.

FIG. 3 is a block diagram showing an example of the functional configuration of the first communication device 10 in this exemplary embodiment. As shown in FIG. 3, the first communication device 10 in this exemplary embodiment includes a parameter acquisition section 11, a vendor information extraction section 12, an environmental information memory 13, an operation mode memory 14, an operation mode setting section 15, a communication controller 16, a connection state detection section 17, and a display controller 18.

Of these, the environmental information memory 13 and the operation mode memory 14 are implemented by, for example, the nonvolatile memory 4. The CPU 1 reads the programs stored in the ROM 3 and the like on the RAM 2 and executes the programs to implement the functions of the parameter acquisition section 11, the vendor information extraction section 12, the operation mode setting section 15, the communication controller 16, the connection state detection section 17, and the display controller 18.

The parameter acquisition section 11 performs DHCP negotiation described below and acquires network parameters as an example of communication setting information from the DHCP server 30. The network parameters include, for example, information regarding the IP address of the communication device, the address of the SIP server 40, the extension number of the communication device, the SIP domain, and the like. In this exemplary embodiment, the DHCP server 30 as an example of server having communication setting information and the parameter acquisition section 11 as an example of a first acquisition unit that acquires communication setting information are respectively provided.

The vendor information extraction section 12 analyzes the network parameters acquired by the parameter acquisition section 11. When the network parameters include information (hereinafter, referred to as "vendor information") for identifying the provider (hereinafter, simply referred to as "vendor") of the network 80 as the parameter specific to the network 80, the vendor information extraction section 12 extracts the vendor information from the network parameters.

The environmental information memory 13 stores the correspondence relationship between the vendor information and information (hereinafter, referred to as "network identification information") for identifying a network environment to be provided by the vendor. The correspondence relationship is established such that, for example, "a vendor A corresponds to an NGN environment a, a vendor B corresponds to an NGN environment b, a vendor C corresponds to an Internet environment, . . . ". The network identification information is an example of network identification information.

The vendor information extraction section 12 acquires network identification information corresponding to the network 80 on the basis of the extracted vendor information with reference to the environmental information memory 13. In this exemplary embodiment, as an example of a second acquisition unit that acquires network identification information, the vendor information extraction section 12 is provided with a function of acquiring the network identification information.

The operation mode memory 14 stores the correspondence relationship between network identification information and an operation mode of the first communication device 10 corresponding to the network environment identified by the network identification information. The correspondence relationship is established such that, for example, "an NGN mode a corresponds to the NGN environment a, an NGN mode b corresponds to the NGN environment b, an Internet mode corresponds to the Internet environment, ... ". These operation modes define the sequence of call control or the like shown in FIGS. 2A and 2B.

The operation mode setting section 15 sets an operation mode for use in the first communication device 10 to an operation mode corresponding to the network 80 on the basis of the network identification information acquired by the vendor information extraction section 12 with reference to the operation mode memory 14. The operation mode is an example of an operation scheme. In this exemplary embodiment, the operation mode setting section 15 is provided as an example of a selection unit that selects an operation scheme of the communication device.

The communication controller 16 performs call control in accordance with the operation mode set by the operation mode setting section 15 and controls communication between the first communication device 10 and the second communication device 20. In this exemplary embodiment, the communication controller 16 is provided as an example of a receiving unit.

The connection state detection section 17 detects connection of the first communication device 10 to the network 80 and disconnection of the first communication device 10 from the network 80.

The display controller 18 controls such that information for notifying the network identification information of the network 80, the operation mode set by the operation mode setting section 15, and the like to the user of the first communication device 10 is displayed on the operation panel (not shown) through the input/output interface 5.

Although in this exemplary embodiment, the vendor information and the network identification information as an example of network identification information are differentiated from each other, both may be regarded as the same and the vendor information may be treated as an example of the network identification information. In such a case, for example, instead of the environmental information memory 13 and the operation mode memory 14, a single memory that stores the correspondence relationship between the vendor information and the operation mode may be provided in the first communication device 10, and the operation mode setting section 15 may set the operation mode on the basis of the vendor information extracted by the vendor information extraction section 12 with reference to the memory.

The DHCP negotiation will now be described.

Figure 4:
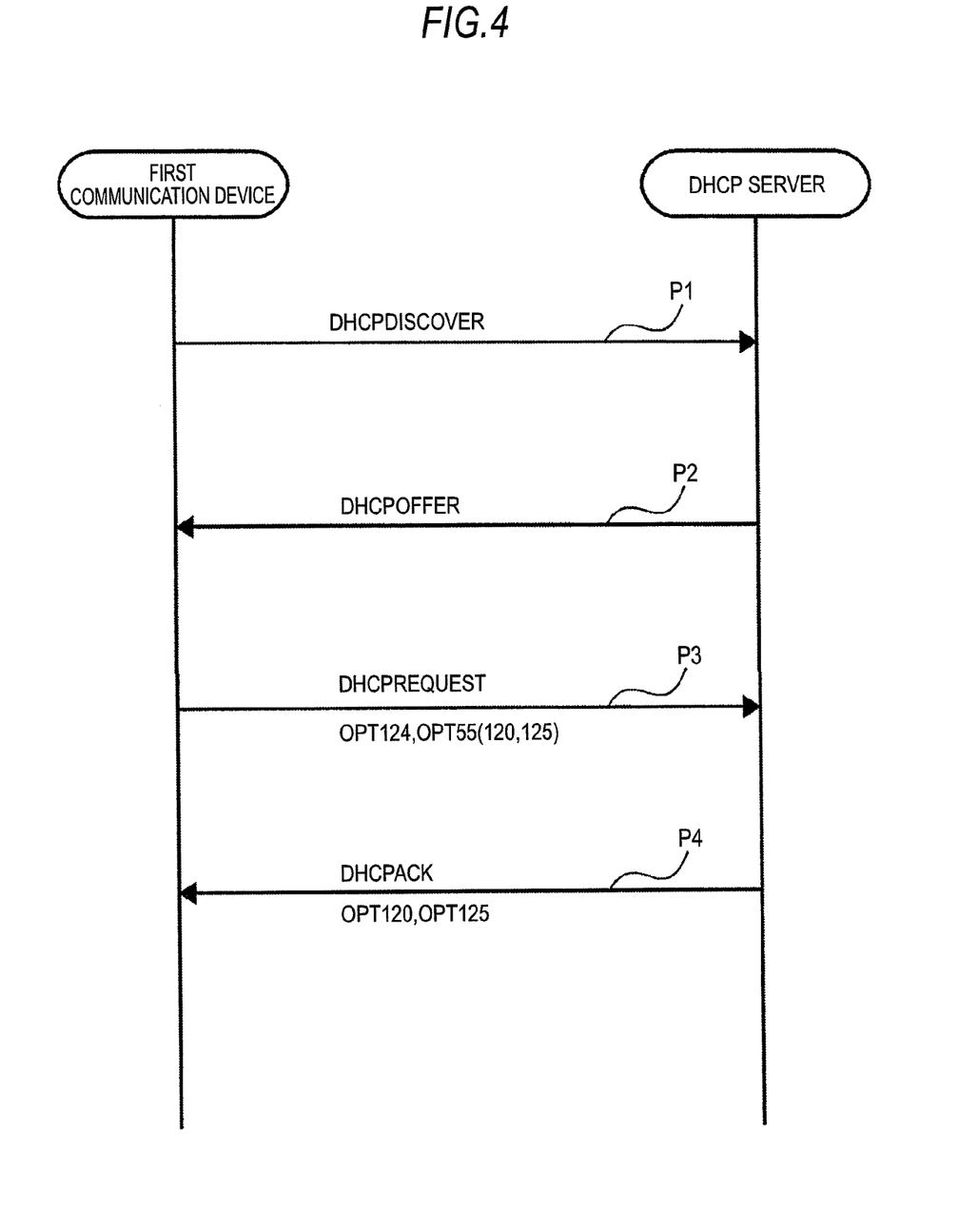
FIG. 4 is a sequence diagram illustrating DHCP negotiation between a first communication device and a DHCP server according to an exemplary embodiment of the invention.

FIG. 4 is a sequence diagram illustrating the DHCP negotiation between the first communication device 10 and the DHCP server 30 in this exemplary embodiment. As shown in FIG. 4, a DHCPDISCOVER message is first sent from the first communication device 10 to the DHCP server 30 (P1). A DHCPOFFER message is sent from the DHCP server 30 to the first communication device 10 as a response to the DHCPDISCOVER message (P2), and an IP address is assigned (leased) to the first communication device 10.

Subsequently, a DHCPREQUEST message is sent from the first communication device 10 to the DHCP server 30 (P3). At this time, the parameter acquisition section 11 of this exemplary embodiment adds the vendor information of the first communication device 10 (Option 124) and a request parameter list (Option 55) as an option to the DHCPREQUEST message. A request to acquire the address of the SIP server 40 (Option 120) and a request to acquire the extension number of the first communication device 10, the SIP domain, and the (network-side) vendor information of the network 80 (Option 125) are added to the request parameter list. These options are defined in RFC (Request For Comments) issued by IETF (Internet Engineering Task Force).

A DHCPACK message is sent from the DHCP server 30 to the first communication device 10 as a response to the DHCPREQUEST message (P4), and the DHCP negotiation ends. When the DHCPACK message includes the SIP server address (Option 120), the extension number, the SIP domain, and the vendor information (Option 125), the vendor information extraction section 12 extracts the vendor information of the network 80 from the DHCPACK message. As described above, the extracted vendor information is used when the operation mode setting section 15 sets the operation mode.

Hereinafter, processing in which the first communication device 10 in this exemplary embodiment sets the operation mode will be described in detail.

Figure 5:
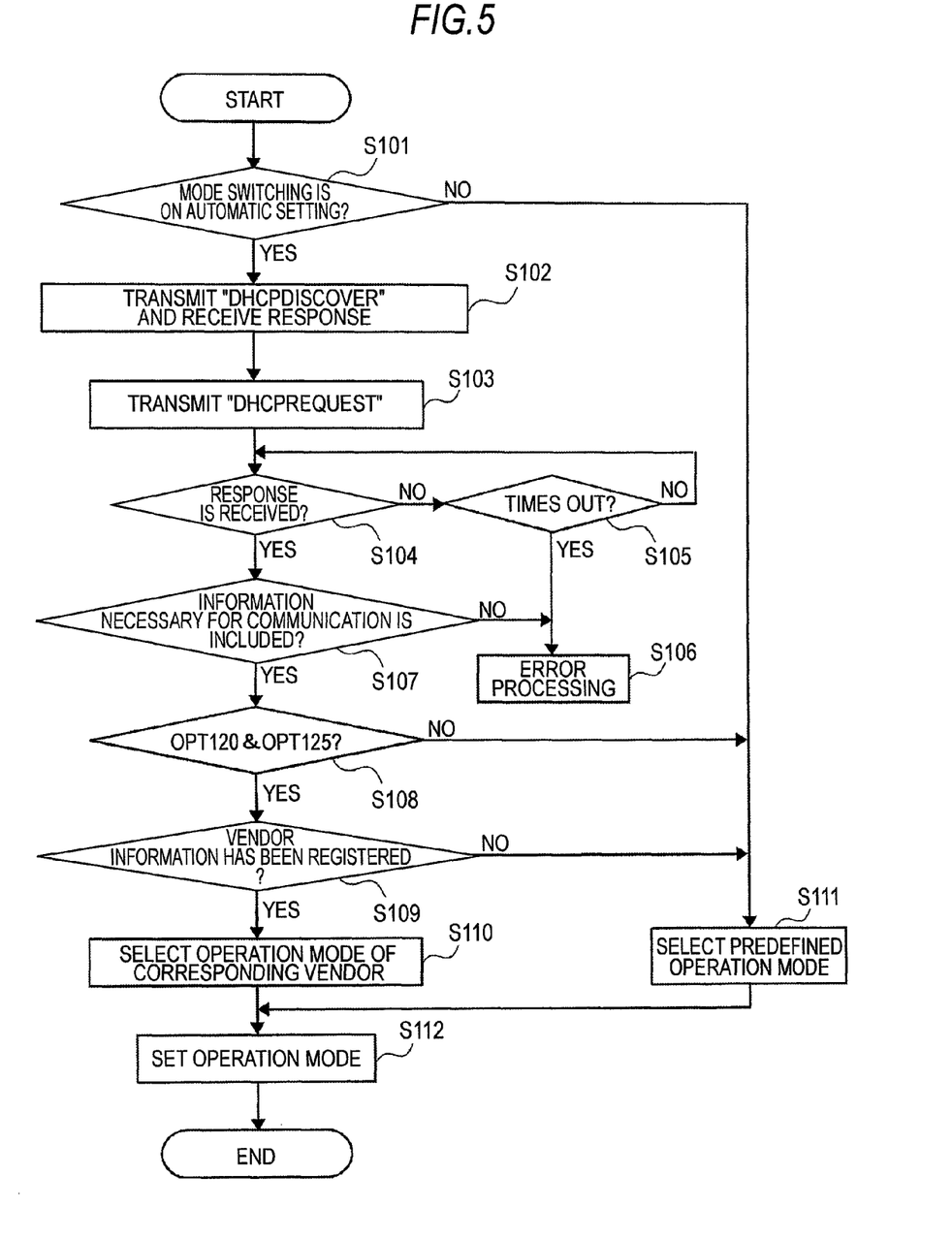
FIG. 5 is a flowchart showing the flow of processing for setting an operation mode at the time of activation of a first communication device according to an exemplary embodiment of the invention.

FIG. 5 is a flowchart showing the flow of processing for setting the operation mode at the time of the activation of the first communication device 10 in this exemplary embodiment.

First, with regard to the switching of the operation mode, the operation mode setting section 15 determines whether or not a setting (automatic setting) is made such that the switching is performed with no manipulation of the administrator with reference to, for example, a flag stored in the nonvolatile memory 4 (Step 101). When the automatic setting is made, the parameter acquisition section 11 performs the above-described DHCP negotiation. Specifically, DHCPDISCOVER is first transmitted from the first communication device 10, and DHCPOFFER which is the response to DHCPDISCOVER is received from the DHCP server 30 (Step 102). Subsequently, DHCPREQUEST is transmitted from the first communication device 10 (Step 103).

When DHCPACK which is the response to DHCPREQUEST is received from the DHCP server 30 (Yes in Step 104), the processing for setting the operation mode progresses to Step 107. Meanwhile, when DHCPACK is not received from the DHCP server 30 (No in Step 104), the parameter acquisition section 11 determines whether or not the reception of the response has timed out (Step 105). When the reception has timed out, error processing is performed (Step 106). If the reception has not timed out, the processing returns to Step 104.

In Step 104, when the response from the DHCP server 30 is received, the parameter acquisition section 11 determines whether or not DHCPACK as the response includes information necessary for SIP communication (Step 107). The information necessary for SIP communication includes, for example, the IP address of the communication device, the address of the SIP server 40, the extension number of the communication device, and the SIP domain. When these pieces of information are not included, since SIP communication cannot be performed, in Step 106, the error processing is performed.

Meanwhile, when the information necessary for SIP communication is included, the vendor information extraction section 12 determines whether or not these pieces of information are acquired as Option 120 and Option 125 described above (Step 108). When the information is acquired as these options, the vendor information extraction section 12 extracts the vendor information included as Option 125, and determines whether or not the vendor information is stored in the environmental information memory 13 (Step 109). When the extracted vendor information is stored in the environmental information memory 13, the vendor information extraction section 12 acquires the network identification information corresponding to the vendor information from the environmental information memory 13, and the operation mode setting section 15 acquires the operation mode corresponding to the network identification information from the operation mode memory 14. Thus, the operation mode corresponding to the vendor information is selected (Step 110).

When it is determined in Step 101 that the switching of the operation mode is not on the automatic setting and when it is determined in Step 108 that the information is not acquired as Option 120 and Option 125 or when it is determined in Step 109 that the vendor information is not stored in the environmental information memory 13, for example, an operation mode stored in the nonvolatile memory 4 is selected as a predefined operation mode (Step 111).

The operation mode setting section 15 sets the operation mode for use in the first communication device 10 to the operation mode selected in Step 110 or Step 111 (Step 112).

With the above, the processing for setting the operation mode at the time of the activation of the first communication device 10 ends.

Second Exemplary Embodiment

Hereinafter, a second exemplary embodiment of the invention will be described. The same parts as those in the first exemplary embodiment are represented by the same reference numerals, and detailed description thereof will be omitted.

A communication system to which this exemplary embodiment is applied is the same as shown in FIG. 1, and the functional configuration of the first communication device 10 of this exemplary embodiment is the same as shown in FIG. 3. There is a difference in that, while in the first exemplary embodiment, the DHCP negotiation is performed to set the operation mode at the time of the activation of the first communication device 10, in this exemplary embodiment, the DHCP negotiation is performed to set the operation mode at a specific point of time after the first communication device 10 has been activated (in operation).

As an example of the specific point of time, a point of time is used when a predefined time length elapses after the DHCP negotiation has been performed. Usually, the IP address assigned from the DHCP server 30 to the first communication device 10 includes a period (lease period) where the assignment is valid. If this period has elapsed, the assigned IP address cannot be used. For this reason, the first communication device 10 sends the DHCPREQUEST message regularly even after the IP address has been assigned once (P3 in FIG. 4) and requests reassignment of the IP address. The DHCPREQUEST message is sent, for example, when half of the lease period elapses. Thus, in this exemplary embodiment, the response to the DHCPREQUEST message is received regularly even after the first communication device 10 has been activated (P4 in FIG. 4), and it is determined whether the network environment to which the first communication device 10 is connected is changed or not on the basis of information included in the DHCPACK message as the response.

As another example of the specific point of time, a point of time is used when a LAN (Local Area Network) cable for connecting the first communication device 10 to the network 80 is connected to the first communication device 10. This is because there is a possibility that, if the LAN cable is reconnected, the first communication device 10 is connected to the network 80 in the network environment different from the previous network environment. Thus, in this exemplary embodiment, the DHCP negotiation is performed even at the point of time when the LAN cable is connected, and it is determined whether the network environment to which the first communication device 10 is connected is changed or not on the basis of the information included in the DHCPACK message. The DHCP negotiation after the first communication device 10 has been activated starts from the sending of the DHCPREQUEST message (P3 in FIG. 4) because the IP address has been assigned once.

Figure 6:
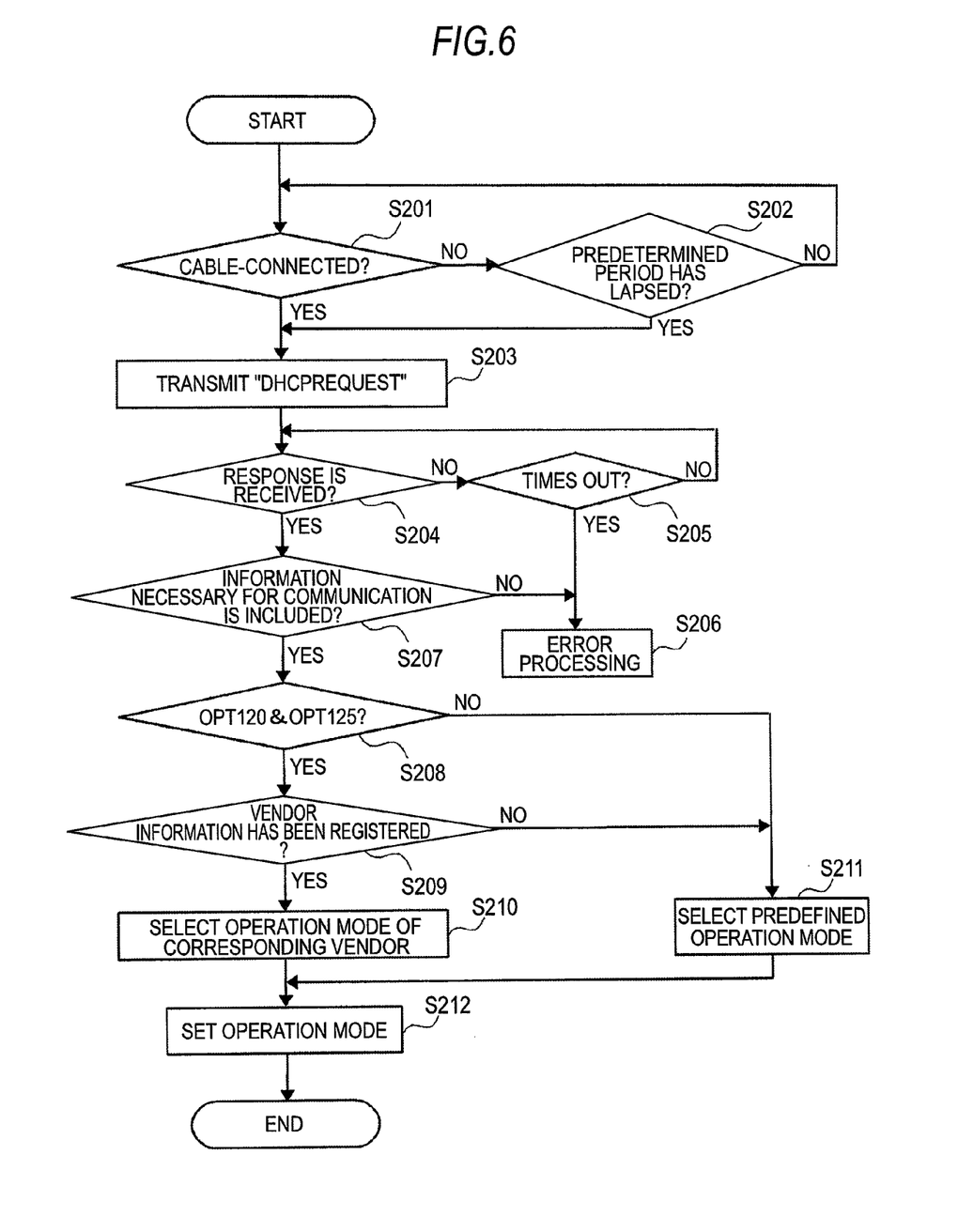
FIG. 6 is a flowchart showing the flow of processing for setting an operation mode after activation of a first communication device according to an exemplary embodiment of the invention.

FIG. 6 is a flowchart showing the flow of processing for setting the operation mode after the activation of the first communication device 10 in this exemplary embodiment.

The connection state detection section 17 first detects whether or not the first communication device 10 is newly connected to the network 80 through the LAN cable (Step 201). When the LAN cable is not newly connected, the parameter acquisition section 11 also determines whether or not a period having a predefined length, for example, half of the lease period of the IP address currently assigned to the first communication device 10, elapses (Step 202). When this period does not elapse, the processing returns to Step 201, and the processing for setting the operation mode waits until any condition of LAN cable connection and period elapsed is satisfied.

When it is detected in Step 201 that the first communication device 10 is newly connected to the network 80 through the LAN cable, or when it is determined in Step 202 that the period having a predefined length has elapsed, the parameter acquisition section 11 performs the above-described DHCP negotiation (after P3 in FIG. 4). The processing after Step 203 is the same as the processing after Step 103 in FIG. 5, thus description thereof will be omitted.

In Step 212, if the operation mode setting section 15 sets the operation mode for use in the first communication device 10 to the operation mode selected in Step 210 or Step 211, the processing for setting the operation mode after the activation of the first communication device 10 ends.

As described above, in the first exemplary embodiment and the second exemplary embodiment, the network identification information is acquired on the basis of the network parameters acquired at the time of or after the activation of the first communication device 10, and the operation mode corresponding to the network 80 is set in accordance with the network identification information. Such a setting of the operation mode may be performed at the time of and after the activation of the first communication device 10, or only after the activation.

Although in the first exemplary embodiment and the second exemplary embodiment, the network parameters are acquired through the DHCP negotiation, the network parameters may be acquired through an alternative other than the DHCP negotiation. For example, when the information necessary for SIP connection, such as the SIP server address, the SIP URI, and the like, cannot be acquired through DHCP, the information may be acquired through an alternative, such as HTTP+SOAP.

For example, when it is detected from the DHCPACK message received after the activation of the first communication device 10 that the network environment to which the first communication device 10 is connected is changed, the display controller 18 may display information for notifying the network environment having been changed to the user on the operation panel (not shown). When the information necessary for SIP connection cannot be acquired by DHCP, or when the information necessary for SIP connection cannot be acquired by the above-described alternative, information for notifying the SIP environment being unusable to the user may be displayed in the same manner.

Figure 7:
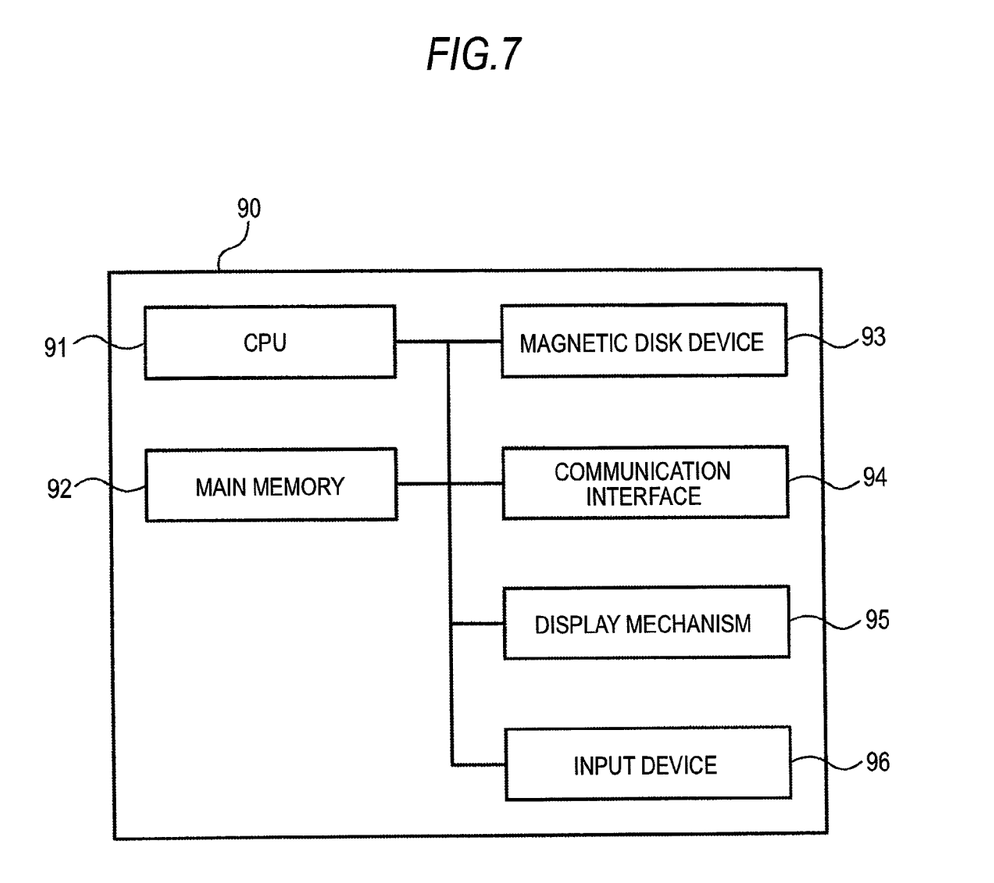
FIG. 7 is a diagram showing the hardware configuration of a computer capable of realizing an exemplary embodiment of the invention.

The processing in which the first communication device 10 sets the operation mode may be performed by a general-use computer 90 provided separately from the first communication device 10. Hereinafter, the hardware configuration of such a computer 90 will be described.

FIG. 7 is a diagram showing the hardware configuration of the computer 90.

As shown in FIG. 7, the computer 90 includes a CPU (Central Processing Unit) 91 serving as an arithmetic unit, and a main memory 92 and a magnetic disk device (HDD: Hard Disk Drive) 93 serving as a memory. The CPU 91 executes various kinds of software, such as an OS (Operating System) and applications, to implement the above-described functions. The main memory 92 is a storage area in which various kinds of software or data for use in executing software is stored. The magnetic disk device 93 is a storage area in which input data to various kinds of software or output data from various kinds of software is stored.

The computer 90 further includes a communication interface 94 for communication with the outside, a display mechanism 95 including a video memory, a display, and the like, and an input device 96 including a keyboard, a mouse, and the like.

A program for implementing this exemplary embodiment may be provided through a communication unit, or may be provided through a recording medium storing the program, such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention is defined by the following claims and their equivalents.

What is claimed is:

1. A communication device comprising:
   a first acquisition unit that acquires communication setting information of the communication device from a server, the communication setting information being information necessary for communication when the communication device communicates with another device through a communication network;
   a second acquisition unit that acquires a network identification information, which is information for identifying the communication network to which the communication device is connected, on the basis of the communication setting information acquired by the first acquisition unit;
   an operation mode memory unit that stores a correspondence relationship between the network identification information and an operation scheme of the communication device; and
   a determination unit that, in accordance with the correspondence relationship, determines the operation scheme of the communication device when the communication device communicates with the another device through the communication network,
   wherein the operation scheme is determined as either an internet mode or a next-generation network mode.

2. The communication device according to claim 1, wherein
   the first acquisition unit acquires the communication setting information from the server at the time of activation of the communication device, and
   the determination unit determines the operation scheme at the time of the activation in accordance with the network identification information acquired by the second acquisition unit from the communication setting information acquired at the time of the activation.

3. The communication device according to claim 2, wherein the communication device acquires the communication setting information regularly after the communication device has been activated.

4. The communication device according to claim 1, wherein
   the second acquisition unit extracts information for identifying a provider of the communication network from the communication setting information acquired by the first acquisition unit to acquire the network identification information.

5. The communication device according to claim 1, wherein
   the determination unit determines the operation scheme where call control according to the communication network identified by the network identification information is performed.

6. The communication device according to claim 1, wherein
   the first acquisition unit acquires the communication setting information from the server at a specific point of time after the activation of the communication device, and
   the determination unit determines the operation scheme in accordance with the network identification information by the second acquisition unit from the communication setting information acquired at the specific point of time.

7. The communication device according to claim 6, wherein
   the first acquisition unit acquires the communication setting information from the server at the specific point of time when a wiring for connecting the communication device to the communication network is connected to the communication device.

8. The communication device according to claim 1, wherein the communication setting information includes a session initiation protocol server address, a session initiation protocol domain, vendor information of the communication network, an internet protocol address of the communication device, and an extension number of the communication device.

9. The communication device according to claim 1, wherein when it is determined that vendor information is not stored in environmental information memory, an operation mode stored in nonvolatile memory is selected as a predefined operation mode.

10. The communication device according to claim 1, wherein when it is detected from a DHCPACK message after an activation of the communication device that the communication network in which the communication device is connected is changed, a display controller displays information for notifying that the communication network has been changed to a user on an operation panel.

11. An image forming apparatus comprising:
    a first acquisition unit that acquires communication setting information of a communication device from a server having communication setting information, which is information necessary for communication when the communication device communicates with another device through a communication network;
    a second acquisition unit that acquires a network identification information, which is information for identifying the communication network to which the communication device is connected, on the basis of the communication setting information acquired by the first acquisition unit;

an operation mode memory unit that stores a correspondence relationship between the network identification information and an operation scheme of the communication device; and a determination unit that, in accordance with the correspondence relationship, determines the operation scheme of the communication device when the communication device communicates with the another device through the communication network;

a receiving unit that performs call control in accordance with the operation scheme determined by the determination unit to receive image data from the another device through the communication network; and an image forming unit that forms an image based on the image data received by the receiving unit, wherein the operation scheme is determined as either an internet mode or a next-generation network mode.

12. The image forming apparatus according to claim 11, wherein the communication setting information includes a session initiation protocol server address, a session initiation protocol domain, vendor information of the communication network, an internet protocol address of the communication device, and an extension number of the communication device.

13. The image forming apparatus according to claim 11, wherein when it is determined that vendor information is not stored in environmental information memory, an operation mode stored in nonvolatile memory is selected as a predefined operation mode.

14. The image forming apparatus according to claim 11, wherein when it is detected from a DHCPACK message after an activation of the communication device that the communication network in which the communication device is connected is changed, a display controller displays information for notifying that the communication network has been changed to a user on an operation panel.

15. The image forming apparatus according to claim 11, wherein the communication device acquires the communication setting information regularly after the communication device has been activated.

16. A method for increasing the possibility that a communication device operates in accordance with an operation scheme based on a communication network where the communication device performs a communication, comprising:

acquiring communication setting information of the communication device from a server having communication setting information, which is information necessary for a communication when the communication device communicates with another device through a communication network;

acquiring a network identification information, which is information for identifying the communication network to which the communication device is connected, on the basis of the acquired communication setting information;

storing a correspondence relationship between the network identification information and an operation scheme of the communication device; and in accordance with the correspondence relationship, determining the operation scheme of the communication device when the communication device communicates with the another communication device through the communication network, wherein the operation scheme is determined as either an internet mode or a next-generation network mode.

17. A non-transitory computer readable medium storing a program causing a computer to execute a process for increasing the possibility that a communication device operates in accordance with an operation scheme based on a communication network where the communication device performs a communication, the process comprising:

acquiring communication setting information of the communication device from a server having communication setting information, which is information necessary for a communication when the communication device communicates with another device through a communication network;

acquiring a network identification information, which is information for identifying the communication network to which the communication device is connected, on the basis of the acquired communication setting information;

storing a correspondence relationship between the network identification information and an operation scheme of the communication device; and in accordance with the correspondence relationship, determining the operation scheme of the communication device when the communication device communicates with the another communication device through the communication network, wherein the operation scheme is determined as either an internet mode or a next-generation network mode.

* * * * *